(No Model.)
O. W. SQUIRES.
BICYCLE.
No. 504,633. Patented Sept. 5, 1893.
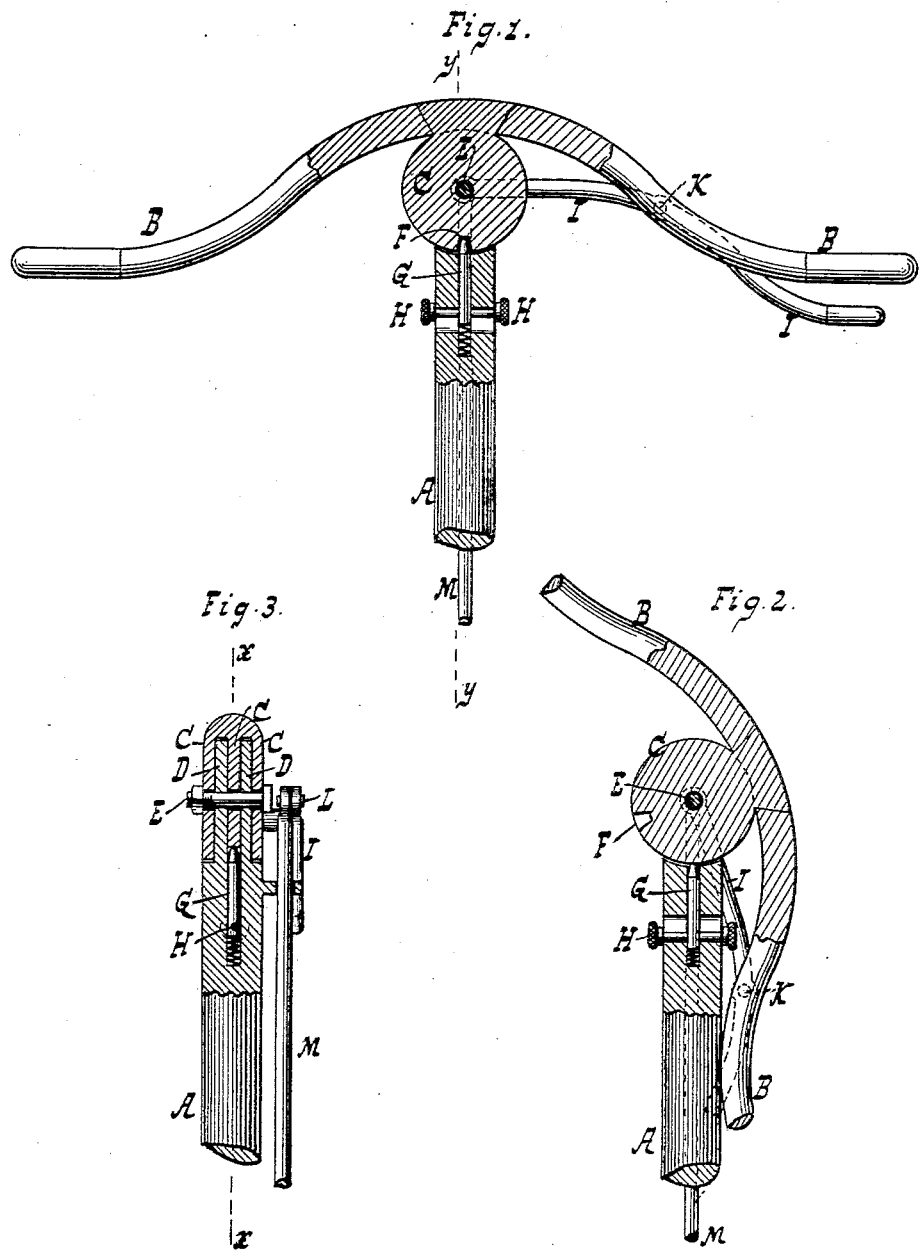
WITNESSES:
William Miller
Edward Wolff
INVENTOR:
Oland W. Squires
BY
Hauff & Hauff
ATTORNEYS.

UNITED STATES PATENT OFFICE.

OLAND W. SQUIRES, OF NEW YORK, N. Y.

BICYCLE.

SPECIFICATION forming part of Letters Patent No. 504,633, dated September 5, 1893.

Application filed March 23, 1893. Serial No. 467,360. (No model.)

*To all whom it may concern:*

Be it known that I, OLAND W. SQUIRES, a citizen of the United States, residing at New York, in the county and State of New York, have invented new and useful Improvements in Bicycles, of which the following is a specification.

This invention relates to an improvement in bicycles and by means of this invention the bicycle can be stored in a narrow place or run through a narrow passage as set forth in the following specification and claims and illustrated in the annexed drawings in which—

Figure 1 is a rear elevation of a steering post and handle partly in section along $xx$ Fig. 3. Fig. 2 is a view similar to Fig. 1 with parts in a different position than in Fig. 1. Fig. 3 is a section along $yy$ Fig. 1.

In the drawings the letter A indicates the steering post of a bicycle and B B is the handle. The handle is pivoted at or near its center to the steering post by a pivot pin or bolt arranged horizontally in a plane at right angles to the longitudinal plane of the handle, so that the latter can swing in a vertical plane to either side of the steering post and lie approximately in line with the latter, thereby placing the handle out of the way so that the bicycle can be run through narrow passages, or the bicycle can be set up in a narrow space, as behind a door, or a number of bicycles can be compactly stored beside each other.

The handle B has a number of depending disks or fingers C and the top of post A has a number of fingers or tines D. By interposing the fingers or tines C D and suitably inserting the pivot pin or bolt E horizontally through the handle B, the latter is pivoted to the post.

One of the disks or tines C of the handle has a notch F which when the handle is horizontal as in Fig. 1 is engaged by spring bolt or catch G to hold the handle fixed. The catch or lock G can be withdrawn by a handle or finger button H suitably projecting from post A the catch G being suitably housed in said post.

The handles or handle bar B B being rigid can be formed of one piece so as to be strong and durable and capable of being cheaply manufactured and applied.

The invention might be applied elsewhere than in bicycles as for example in tricycles, velocipedes and the like.

The brake can be left applied to the bicycle in the ordinary way, the swinging of the handle bar not interfering with the brake apparatus. By having the brake lever I I suitably fulcrumed at K to handle B and jointed or pivoted at L to the rod M actuating the brake shoe, the brake lever I will be in convenient position for actuation when the handle B is horizontal as in Fig. 1 while said brake lever I can be swung out of the way with handle B as in Fig. 2. By having the joint or pivot L in alignment with joint or pivot E the brake lever I can swing with handle B without deranging the brake rod M.

What I claim as new, and desire to secure by Letters Patent, is—

1. The combination with the steering post of a bicycle, of a handle-bar pivoted at or near its center to the post by a pivot pin or bolt arranged horizontally in a plane at right angles to the longitudinal plane of the handle for swinging the latter in a vertical plane to one side of the steering post to enable the bicycle to pass through narrow passages, substantially as described.

2. In a bicycle, the combination with a steering post, of a handle-bar pivoted to the steering post to swing in a vertical plane to a position beside the steering post, and a brake lever fulcrumed on and swinging in a vertical plane with the handle bar, substantially as described.

3. In a bicycle the rigid steering handle or bar jointed at about its center to the steering post, a brake lever fulcrumed on said handle and a brake rod connected to the brake lever by a joint placed in alignment with the joint of the handle substantially as described.

In testimony whereof I have hereunto set my hand in the presence of two subscribing witnesses.

OLAND W. SQUIRES.

Witnesses:
WM. C. HAUFF,
E. F. KASTENHUBER.